US007551855B2

(12) United States Patent
Zami et al.

(10) Patent No.: US 7,551,855 B2
(45) Date of Patent: Jun. 23, 2009

(54) D(WDM) COMMUNICATIONS NETWORK EMPLOYING PERIODIC SPECTRAL MULTIPLEX PROCESSING

(75) Inventors: Thierry Zami, Massy (FR); François Dorgeuille, Paris (FR)

(73) Assignee: Alcatel, Paris (FR)

( * ) Notice: Subject to any disclaimer, the term of this patent is extended or adjusted under 35 U.S.C. 154(b) by 404 days.

(21) Appl. No.: 11/271,842

(22) Filed: Nov. 14, 2005

(65) Prior Publication Data

US 2006/0104639 A1 May 18, 2006

(30) Foreign Application Priority Data

Nov. 15, 2004 (FR) .................................. 04 52614

(51) Int. Cl.
*H04J 14/00* (2006.01)
*H04J 14/02* (2006.01)

(52) U.S. Cl. ............................ 398/82; 398/91; 398/67; 398/70

(58) Field of Classification Search ............. 398/82–85, 398/91, 92, 60, 66–70, 73
See application file for complete search history.

(56) References Cited

U.S. PATENT DOCUMENTS 6,616,349 B1 9/2003 Li
7,181,095 B1 * 2/2007 Meli et al. .................... 385/11
7,310,481 B2 * 12/2007 Park et al. ..................... 398/72
2002/0080443 A1 6/2002 Stern
2004/0033076 A1 * 2/2004 Song et al. .................... 398/70

FOREIGN PATENT DOCUMENTS

EP 1 271 827 A1 1/2003

* cited by examiner

*Primary Examiner*—Dalzid Singh
(74) *Attorney, Agent, or Firm*—Sughrue Mion, PLLC

(57) ABSTRACT

A WDM network (R) comprises an optical fiber (F) connected to a hub (H) via an input of a demultiplexer (DX) having N outputs to communications stations ($S_i$-$S_n$) able to deliver and/or receive spectral multiplexes of modulated optical signals with different wavelengths, via coupling means (CP, CP', MXB). The communications stations ($S_{n-1}$) are adapted to deliver spectral multiplexes of modulated optical signals from a given one of P disjoint bands of wavelengths. At least one of the coupling means (MXB) is a 2×1 band multiplexer comprising i) an output connected to a downstream portion of the optical fiber (F), ii) a first input connected to one of the stations (then referred to as the "primary" station) and adapted to its band of wavelengths, and iii) a second input connected to an upstream portion of the optical fiber (F) and adapted to channels having wavelengths different from those of the channels passing through the first input. The demultiplexer (DX) is of periodic type so as to deliver at each of its N outputs channels whose wavelengths belong to distinct sets of P wavelengths each belonging to a distinct one of the P disjoint bands.

22 Claims, 2 Drawing Sheets

H
MT
DMX
CP'
CR
MDB$_{n-2}$
CR
CP
MDB$_{n-1}$
F"
CR
DO
CR
CP
CP
CP
MR
DO
MR
MT
MR
MT
MR
MT
MR
MT
S$_1$
DO
S$_{n-2}$
DO
S$_{n-1}$
S$_n$

D(WDM) COMMUNICATIONS NETWORK EMPLOYING PERIODIC SPECTRAL MULTIPLEX PROCESSING

BACKGROUND OF THE INVENTION

1. Field of the Invention

The field of the invention is that of (dense) wavelength division multiplexing ((D)WDM) networks, and more particularly that of the transmission of data (or optical signals) in such networks.

2. Description of the Related Art

As the person skilled in the art knows, wavelength division multiplexing is a technique that optimizes the use of data transmission resources (for example optical fibers) of an optical network. Such optimization is particularly important if those resources are limited or become insufficient because of the connection of new communications stations (or nodes), or in order to limit the cost of the network.

Wavelength division multiplexing is insufficient in some situations in which the network architecture needs to be optimized.

Many solutions to this have been proposed, for example integrating passive multiplex add/drop devices such as optical couplers or optical add and drop multiplexers (OADM), possibly of the reconfigurable type (R-OADM), or the co-propagation of upstream and downstream traffic in the same fiber by sharing its bandwidth. Those solutions may still be insufficient, however.

The extent of an optical network is limited by its range, i.e. by the power necessary to transmit multiplexes between the network access node (also known as the “hub”, which is generally connected to a federator network (also known as the “backbone”), and the communications station farthest therefrom. To economize on this power, there has been proposed an unbalanced mode of coupling traffic coming from a given communications station and traffic coming from optical fiber portions on the upstream side of that communications station. For example, a communications station near the hub is the subject of 10%/90% coupling and a communications station near the edge of the network is the subject of 50%/50% coupling. Optimizing the coupling ratios in this way loosens the constraint related to power, but cannot eliminate it entirely.

SUMMARY OF THE INVENTION

Thus an object of the invention is to improve on this situation, and in particular to optimize the architecture of (D)WDM optical networks to improve their performance (in terms of capacity and/or power economy), preferably without increasing their cost.

To this end the invention proposes a wavelength division multiplex optical network comprising an optical fiber connected to a hub via an input and/or output of a demultiplexer and/or multiplexer having N outputs coupled to said hub and to communications stations able to deliver and/or receive spectral multiplexes of modulated optical signals with different wavelengths via coupling means.

It is important to note that the component referred to above as the “demultiplexer and/or multiplexer” is a simple demultiplexer, a simple multiplexer or a combination demultiplexer and multiplexer, according to whether it is connected to a monodirectional upstream optical fiber, a monodirectional downstream optical fiber or a bidirectional optical fiber.

There are two different variants of the optical network of the invention.

In a first variant, the optical network is characterized in that:

its communications stations are adapted to deliver and/or receive spectral multiplexes of modulated optical signals from a given one of P disjoint bands of wavelengths;

at least one of the coupling means is a 2×1 band multiplexer and/or demultiplexer comprising i) an output and/or input connected to a “downstream” portion of the optical fiber, ii) a first input and/or output connected to one of the stations, which is then referred to as the “primary” station, and adapted to its band of wavelengths, and iii) a second input and/or output connected to an “upstream” portion of the optical fiber and adapted to channels of wavelengths different from the wavelengths of the channels passing through the first input and/or output; and its demultiplexer and/or multiplexer is of periodic type so as to deliver and/or receive at each of its N outputs and/or inputs channels of wavelengths that belong to distinct sets (or combs) of P wavelengths, each belonging to a distinct one of the P disjoint bands.

It is important to note here that the P disjoint (and therefore distinct) bands of wavelengths are those that are filtered by the inputs or outputs of the band multiplexers or band demultiplexers.

A network of this kind comprises at most P primary communications stations connected to 2×1 band multiplexers and/or demultiplexers.

This demultiplexer and/or multiplexer may be of the periodic cyclic type. It may then take the form, for example, of a wavelength diffraction device of the arrayed waveguide grating (AWG) type, or a cascade of de-interleavers and/or interleavers.

A second variant of the optical network is characterized in that:

its communications stations are adapted to deliver and/or receive spectral multiplexes of modulated optical signals from a given one of P disjoint combs of wavelengths;

at least one of its coupling means is a 2×1 wavelength interleaver and/or de-interleaver comprising i) an output and/or input connected to a “downstream” portion of said optical fiber, ii) a first input and/or output connected to one of said communications stations, which is then referred to as the “primary” station, and adapted to its comb of wavelengths, and iii) a second input and/or output connected to an “upstream” portion of said optical fiber and adapted to combs different from the comb passing through said first input and/or output; and its demultiplexer and/or multiplexer is a band demultiplexer and/or multiplexer so as to deliver and/or receive at each of its N outputs and/or inputs channels wavelengths that belong to distinct sets of P wavelengths, each belonging to a distinct one of said P disjoint combs.

It is important to note here that the P disjoint (and therefore distinct) combs of wavelengths are those that are filtered by the inputs and/or outputs of the wavelength interleavers and/or de-interleavers.

A network of this kind comprises at most P primary communications stations connected to 2×1 wavelength interleavers and/or de-interleavers.

Either variant of the network may have other features, and in particular, separately or in combination:

at least one of the coupling means may be a 2×1 add or drop optical coupler and has i) a first output and/or input connected to a “downstream” portion of the optical fiber, ii) a first input and/or output connected to one of the stations, which is then referred to as the “secondary”

station, and iii) a second input and/or output connected to an "upstream" portion of the optical fiber;

the optical fiber is of monodirectional upstream type, the demultiplexer and/or multiplexer is a demultiplexer having one input and N outputs, and each communications station may include at least one multiplex sender device connected to an optical coupler, itself coupled to one of the coupling means or directly to the optical fiber;

in a first variant, the optical fiber is of the monodirectional downstream type, the demultiplexer and/or multiplexer is a multiplexer having one output and N inputs, and each communications station includes at least one multiplex receiver device connected to switching means coupled to one of the coupling means or to directly to the optical fiber;

in a second variant the optical fiber is of bidirectional type, the demultiplexer and/or multiplexer is a demultiplexer/multiplexer having one input/output and N outputs/inputs, and each communications station may include at least one multiplex sender device connected to an optical coupler, at least one multiplex receiver device connected to switching means, and an optical circulator coupled to one of the coupling means (or directly to the optical fiber) and to the switching means and the optical coupler;

in a second variant the network may comprise i) a first output of monodirectional downstream type, connected to a multiplexer having one output and N inputs, ii) a second optical fiber of monodirectional upstream type, connected to a demultiplexer having one input and N outputs, and each communications station includes at least one multiplex sender device connected to an optical coupler, itself coupled to one of the coupling means connected to the second optical fiber or to the second optical fiber, and at least one multiplex receiver device, either connected to switching means, itself connected to one of the coupling means connected to the first optical fiber or connected directly to the first optical fiber; and the switching means may be a demultiplexer or a wavelength selector switch, for example.

The invention is well adapted, although not exclusively so, to ring or bus structure (D)WDM optical networks.

BRIEF DESCRIPTION OF THE DRAWINGS

Other features and advantages of the invention become apparent on reading the following detailed description and examining the appended drawings, in which.

The appended drawings constitute part of the description of the invention and may, if necessary, contribute to the definition of the invention.

DETAILED DESCRIPTION OF EXEMPLARY EMBODIMENTS OF THE PRESENT INVENTION

An object of the invention is to optimize the architecture of (D)WDM optical networks to improve their performance (in terms of capacity and/or power economy), preferably without increasing their cost.

It is considered below, by way of illustrative example, that the optical network is a "circuit mode" network, for example a telecommunications access metropolitan area network. The invention is not limited to this application alone, however. Moreover, the optical network may be a ring network, but this is not obligatory. The invention applies to other types of optical network, and in particular to bus structure optical networks.

Figure 1:
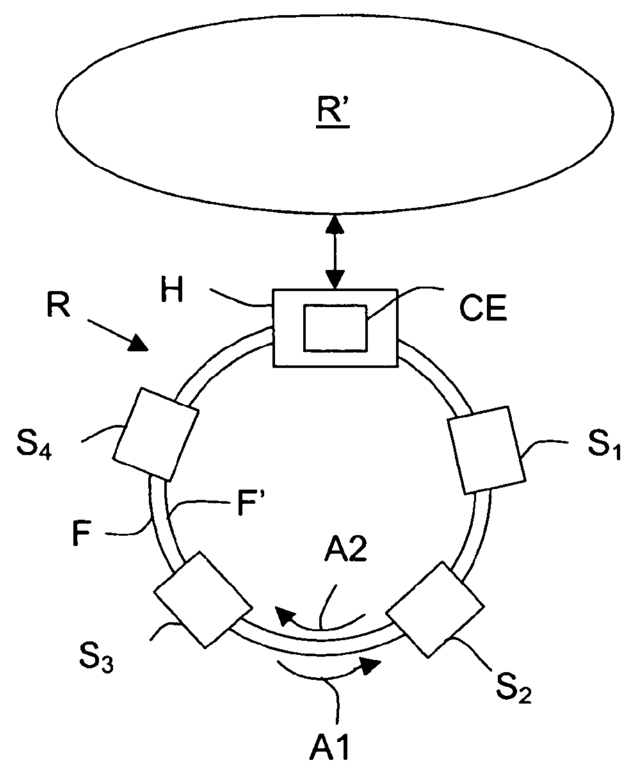
FIG. 1 shows very diagrammatically one embodiment of a ring communications network connected to a backbone.

FIG. 1 shows a ring network R. This kind of network R conventionally includes a hub (or "point of presence") H is connected to at least one of the two ends of optical fibers F, F' for transmitting data in the form of optical signals and a plurality of user stations $S_i$ (in this example the value of the suffix i is from 1 to 4, but it may take any value greater than or equal to two (2)), optically coupled to the fibers F, F' via coupling means described below with reference to FIGS. 2 to 4.

The ring network R is generally connected to a "backbone" R' via the hub H.

The network R includes, for example, a monodirectional upstream transmission optical fiber F dedicated to upstream traffic from the stations $S_i$ to the hub H (arrow A1) and a monodirectional downstream transmission optical fiber F' dedicated to downstream traffic from the hub H to the stations $S_i$ (arrow A2). However, as emerges below with reference to FIG. 4, a simplified network R may be envisaged in which there is only one bidirectional fiber, dedicated to both types of traffic (upstream and downstream).

Moreover, it may equally be envisaged that the network R includes at least one other optical fiber dedicated to the protection of traffic in the event of failure on the optical fiber F and the optical fiber F' (or on the single bidirectional fiber).

The hub H, which is preferably of electronic type, includes storage means, such as electronic memories, for storing traffic at least temporarily, and an Ethernet or IP electronic switch CE equipped with optical/electrical/optical (O/E/O) converter means so as to be able to access all of the traffic circulating in the network (here in the ring). This kind of electronic switch CE is generally referred to as a "concentrator".

The portion dedicated to upstream traffic is described in detail below with reference to FIG. 2, in an example of an optical network of the invention in which upstream and downstream traffic are carried by different optical fibers F and F'.

The upstream optical fiber F is connected to the input of a demultiplexer DX that also has N outputs each connected to a receiver module MR of the hub H and to communications stations $S_i$ including send modules MT able to deliver spectral multiplexes of modulated optical signals with different wavelengths, via coupling means that are discussed further below.

For example, each station $S_i$ includes at least one send module MT, for example four such modules. Each send module MT includes sources comprising at least one generator, for example of tunable wavelength and delivering light at one wavelength at least, and a modulator fed by an electronic circuit and responsible for modulating this light in order to deliver modulated optical signals at its output. The generators are tunable wavelength lasers, for example. However, they could equally be fixed wavelength lasers. Each source further includes means for controlling its outputs in order to deliver optical signals at selected wavelengths.

Each send module MT is connected to one of the inputs of a (passive) optical coupler CP whose output is connected directly to the optical fiber F or to coupling means CP' or $MXB_i$ in order to feed it spectral multiplexes consisting of modulated optical signals with different wavelengths delivered by the sources.

The coupling means $MXB_i$ used depend in particular on the type of demultiplexer DX that is connected to the hub H.

Two embodiments may be envisaged.

In a first embodiment, the processing modules MT of the communications stations $S_i$ deliver spectral multiplexes of modulated optical signals belonging to a given wavelength band from P non-overlapping bands (i.e. bands that do not overlap in pairs).

In the present context the expression "wavelength band" means a set of wavelengths that are in sequence and are to be subjected to the same optical processing.

In this first embodiment, the demultiplexer DX is of periodic type. It defines N virtual logical channels each associated with one of its N outputs and with all the WDM channels leaving via that output. Consequently, communications stations $S_i$ may share the same virtual logical channel by sending their optical signals on optical channels with different wavelengths, given that an output of the demultiplexer DX must receive at any given time only one physical channel belonging to the associated class (or virtual logical channel).

If the demultiplexer DX is of periodic type, a "virtual logical channel" is a class grouping the physical channels whose optical frequencies are spaced by an integer multiple of the spectral period of the demultiplexer DX.

In other words, the demultiplexer DX delivers at each of its N outputs channels whose wavelengths belong to distinct sets (also known as combs) of P wavelengths, each of which belongs to a distinct band from the P disjoint bands.

If the upstream fiber F supports M physical channels (or wavelengths), and the number of outputs of the demultiplexer DX (and therefore the number of virtual logical channels that it defines) is equal to N, then the number of bands P supported by the upstream fiber F is equal to M/N, and each of the N virtual logical channels comprises P different physical channels belonging to P respective different bands.

For example, if M is equal to 80 and N is equal to 16, then P is equal to 80/16=5, and each virtual logical channel comprises five different physical channels belonging to five respective different bands. The network can then be organized so that at any time the demultiplexer DX delivers at its 16 outputs one of the five wavelengths (from the five different bands) of each of the 16 virtual logical channels.

It is important to note that the periodicity may be simple or cyclic. Simple periodicity corresponds to the periodicity of the filtering function in the optical frequency domain. Cyclic periodicity is a special case of simple periodicity. It occurs if the spectral distance between the last channel of one order of the filtering function and the first channel of the next order is equal to the spectral distance between the channels of the same order.

If the periodicity is simple, the demultiplexer DX may take the form of a wavelength diffraction device of the arrayed wavelength grating (AWG) type, for example. If the periodicity is cyclic, the demultiplexer DX may take the form of an AWG or a cascade of de-interleavers, for example.

In this first embodiment, the term "primary station" refers to a communications station $S_i$ that is connected to coupling means $MXB_i$ taking the form of a 2×1 band multiplexer that can use one band of wavelengths from P disjoint bands of wavelengths.

In a network including a fiber F supporting P bands, there can therefore be no more than P primary stations connected to that fiber F.

If a communications station $S_i$ is not connected to the fiber F by a band multiplexer $MXB_i$, it is referred to as a "secondary station". This applies to the stations $S_1$ and $S_n$ in the present example, for example.

If m secondary stations are connected to the fiber F, they use the same one of the P bands. Consequently, P−1 bands remain available to the P−1 primary stations (connected to the same fiber F). The P−1 stations farthest from the hub H, apart from the last one $S_n$ if it is of secondary type (as shown here) are preferably of primary type.

Each band multiplexer $MXB_i$ has an output connected to a "downstream" portion of the upstream fiber F, a first input connected to the associated primary station and adapted to the band of wavelengths thereof, and a second input connected to an "upstream" portion of the upstream fiber F and adapted to channels whose wavelengths are different from those of the channels passing through the first input. The "upstream" and "downstream" concepts refer to positions relative to the hub H that is farthest downstream along the upstream fiber F. Consequently, each band multiplexer $MXB_i$ combines the spectral multiplexes belonging to the band of wavelengths of the primary station $S_i$ to which it is connected with the spectral multiplexes belonging to the bands of wavelengths of the primary stations $S_{i+m}$ ($m \geqq 1$) on the upstream side.

Figure 2:
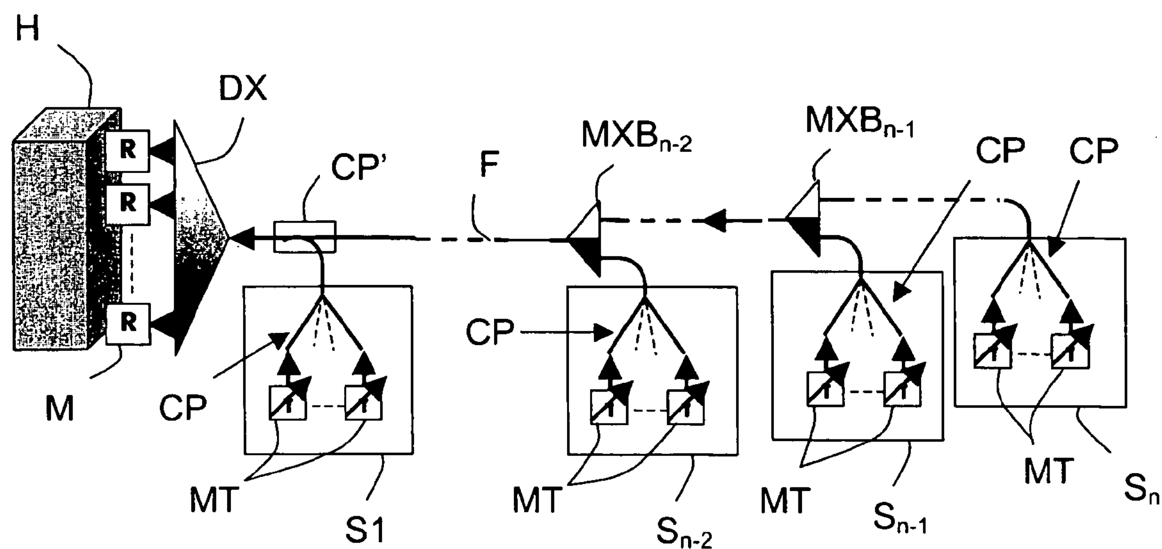
FIG. 2 shows diagrammatically one embodiment of a portion of an optical network of the invention equipped with a monodirectional upstream fiber.

In the FIG. 2 example, the primary stations $S_{n-1}$ and $S_{n-2}$ are connected to the upstream fiber F by respective wavelength band multiplexers. The last station $S_n$ at the upstream end of the upstream fiber F is connected to the fiber via its passive optical coupler CP, which is connected to its send modules MT. In this example, it is therefore of secondary type. Moreover, the other stations (here $S_1$) at the downstream end of the upstream fiber F are connected to the fiber via a 2×1 optical coupler CP' with a 10%/90% coupling ratio, for example. They are therefore also of secondary type in this example.

In the case of a network R including eight communications stations $S_i$, for example, the five stations $S_3$ to $S_7$ farthest from the hub, apart from the last station $S_8$, are connected to the upstream fiber F by respective multiplexers $MBX_i$ and are therefore of primary type, while the two stations $S_1$ and $S_2$ nearest the hub and the station $S_8$ farthest away are connected to the upstream fiber F by respective optical couplers CP' or else directly, and they are therefore of secondary type.

In a second embodiment, the send modules MT of one or more of the primary communications stations $S_i$ are responsible for deriving from the spectral multiplexes modulated optical signals belonging to a given comb of wavelengths from P disjoint combs (i.e. combs that do not overlap in pairs).

In the present context, the expression "comb of wavelengths" refers to a set of optical signals whose optical carrier frequencies are regularly spaced.

In this second embodiment, the demultiplexer DX is a band demultiplexer. It defines N virtual logical channels each associated with one of the N outputs and with the wavelengths of the band associated with that output, and therefore delivers at each of its N outputs one of the wavelengths of the virtual logical channel (and therefore of the band) that is associated with it.

In other words, the demultiplexer DX delivers at each of its N outputs channels whose wavelengths belong to distinct sets of P wavelengths, each of which belongs to a distinct comb of the P disjoint combs.

In each comb the distance between two successive wavelengths is at least equal to the distance between bands at the input of the band demultiplexer DX.

If the upstream fiber F supports M physical channels (or wavelengths) and the number of outputs of the band demultiplexer DX (and therefore the number of virtual logical channels that it defines) is equal to N, then the number of combs P supported by the upstream fiber F is equal to M/N and each of the N virtual logical channels comprises P different physical channels belonging to P respective different combs.

For example, if M is equal to 80 and N is equal to 16, then P is equal to 80/16=5, and each virtual logical channel comprises five different physical channels belonging to five respective different combs. The network can then be organized so that at all times the band demultiplexer DX delivers at its 16 outputs one of the five wavelengths (of the five different combs) of each of the 16 virtual logical channels.

In this second embodiment, the primary stations $S_i$ (which are preferably those farthest from the hub H, where applicable with the exception of the last one $S_n$ when it is at the end of the upstream fiber F), are connected to respective coupling means $MXB_i$ each taking the form of a 2×1 interleaver.

Each interleaver $MXB_i$ has an output connected to a downstream portion of the upstream fiber F, a first input connected to the associated primary station and adapted to its comb of wavelengths, and a second input connected to an upstream portion of the upstream fiber F and adapted to channels whose wavelengths are different from those of the channels passing through the first input. Consequently, each interleaver $MXB_i$ combines the spectral multiplexes belonging to the comb of wavelengths of the primary station $S_i$ to which it is connected with the spectral multiplexes belonging to the combs of wavelengths of the primary stations $S_{i+m}$ (m≧1) on its upstream side.

As in the first embodiment, the last station $S_n$ at the upstream end of the upstream fiber F is connected to the fiber via its passive optical coupler CP. It is therefore of secondary type just like the other stations that are near the downstream end of the upstream fiber F and that are connected to the fiber via respective 2×1 optical couplers CP' with a 10%/90% coupling ratio, for example.

The portion dedicated to downstream traffic is described in detail below with reference to FIG. 3, in an example of an optical network of the invention in which upstream traffic and downstream traffic is carried by different optical fibers F and F'.

The downstream optical fiber F' is connected to the output of a multiplexer MX having N further inputs, each connected to a send module MT of the hub H and to the communications stations $S_i$ which include receive modules MR able to receive spectral multiplexes of modulated optical signals with different wavelengths via coupling means discussed further below.

Each receive module MR is connected to one of the outputs of a fixed optical demultiplexer or of a wavelength selector switch DO whose input is connected directly to the optical fiber F' or to coupling means CP' or $DXB_i$ in order to be supplied with spectral multiplexes consisting of modulated optical signals belonging to the band or comb of wavelengths of its station $S_i$.

For example, each station $S_i$ includes one or more receive modules MR, for example four such modules. Each receive module MR includes a processing circuit feeding an output that is coupled to a terminal, for example.

The processing circuit comprises a receiver having an input fed with isolated (and therefore filtered) optical channels by one of the outputs of the fixed optical demultiplexer or the wavelength selector switch DO and whose purpose is to convert into electrical signals optical signals that have the selected wavelength in order that they may be processed.

As in the case of the upstream fiber F, the coupling means $DXB_i$ used depend, in particular, on the type of multiplexer MX that is connected to the hub H. Because of the principle of the reversibility of light, the two embodiments described above apply equally here.

Consequently, in the first embodiment, each communications station $S_i$ receives spectral multiplexes of modulated optical signals belonging to a given one of P disjoint bands of wavelengths. Moreover, the multiplexer MX is of periodic type. It also defines N virtual logical channels each associated with one of its N inputs and with wavelengths belonging to different bands of wavelengths and must receive at any given time on each input only one physical channel belonging to the associated class (or virtual logical channel).

In other words, the multiplexer MX receives at each of its N inputs channels whose wavelengths belong to distinct sets (or combs) of P wavelengths, each of which belongs to a distinct one of the P disjoint bands.

If the downstream fiber F' supports M physical channels (or wavelengths) and the number of inputs of the multiplexer MX (and therefore the number of virtual logical channels that it defines) is equal to N, then the number of bands P supported by the downstream fiber F' is equal to M/N, and each of the N virtual logical channels comprises P different physical channels belonging to the respective P different bands.

Once again, the periodicity may be simple or cyclic. If the periodicity is simple, the multiplexer MX can take the form of an AWG, for example. If the periodicity is cyclic, the multiplexer MX can take the form of an AWG or a cascade of interleavers, for example.

In this first embodiment, at least the primary stations $S_i$ (which are preferably those farthest from the hub H, possibly with the exception of the last $S_n$ if it is at the end of the downstream fiber F'), are connected to coupling means $DXB_i$ taking the form of a 2×1 band multiplexer of the same type as the band demultiplexer $MXB_i$ described above with reference to FIG. 2.

Each band demultiplexer $DXB_i$ has an input connected to a downstream portion of the downstream fiber F', the first output connected to the associated primary station $S_i$ and adapted to the band of wavelengths therefor, and a second output connected to an upstream portion of the downstream fiber F' and adapted to channels whose wavelengths are different to those of the channels passing through the first output. The upstream and downstream concepts refer to positions relative to the upstream end of the downstream fiber F' that is not connected to the hub H. Consequently, each band demultiplexer $DXB_i$ separates the spectral multiplexes belonging to the band of wavelengths of the station $S_i$ to which it is connected from spectral multiplexes belonging to the bands of wavelengths of the stations $S_{i+m}$ (m≧1) on the upstream side.

Figure 3:
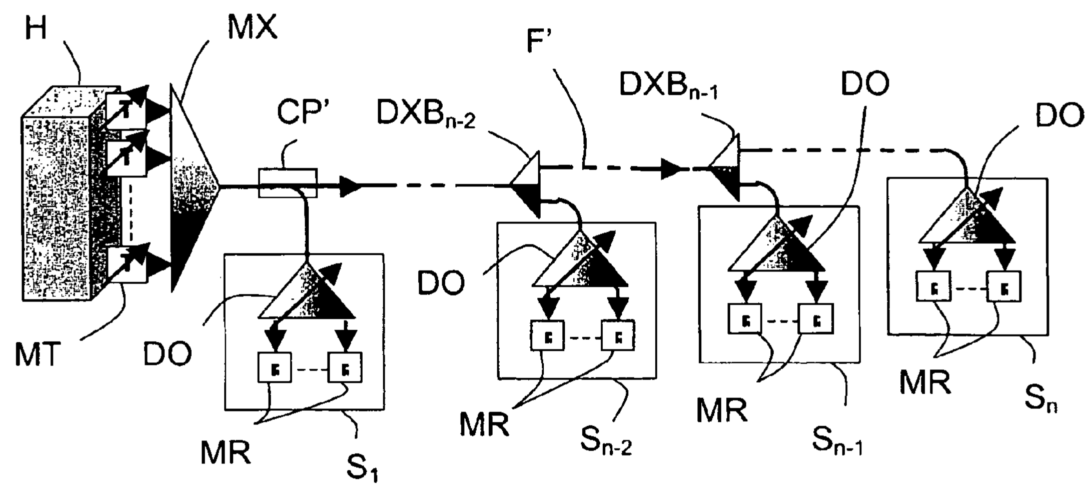
FIG. 3 shows diagrammatically one embodiment of a portion of an optical network of the invention equipped with a monodirectional downstream fiber.

In the FIG. 3 example, the fixed optical demultiplexers or the wavelength selector switches DO of the primary stations $S_{n-1}$ and $S_{n-2}$ are connected to the downstream fiber F' by a wavelength band demultiplexer $DXB_{n-1}$ and $DXB_{n-2}$. The last station $S_n$ at the upstream end of the downstream fiber F' (the end opposite the hub H) is connected to the fiber via its fixed optical demultiplexer or its wavelength selector switch DO that is connected to its receive modules MR. In this example it is therefore of secondary type. Moreover, the fixed optical demultiplexers or the wavelength selector switches DO of the other stations (here $S_1$) near the downstream end of the downstream fiber F' (the same end as the hub H) are connected to the fiber via a 2×1 optical coupler CP' with a 10%/90% coupling ratio, for example. They are therefore also of secondary type in this example.

For example, in the case of a network R including eight communications stations $S_i$, the five stations farthest from the hub $S_3$ to $S_7$, apart from the last station $S_8$, are connected to the downstream fiber F' by respective multiplexers $MBX_i$ and are of primary type, and the two stations nearest the hub $S_1$ and $S_2$ and the stations farthest away $S_8$ are connected to the downstream fiber F' either by an optical coupler CP' or else directly, and they are therefore of secondary type.

In a second embodiment, the receive modules MR of at least one of the primary communications stations $S_i$ receive spectral multiplexes of modulated optical signals belonging to a given one of P disjoint combs of wavelengths.

Moreover, the multiplexer MX is a band multiplexer. It still defines M virtual optical channels, each associated with one of its N inputs and with wavelengths belonging to the band associated with that input, and it feeds each of its N inputs with one of the wavelengths of the virtual logical channel (and therefore of the band) associated with it.

In other words, the multiplexer MX receives at each of its N inputs channels whose wavelengths belong to distinct sets of P wavelengths, each of which belongs to a distinct one of the P disjoint combs.

In each comb the distance between two successive wavelengths is at least equal to the distance between bands at the output of the band multiplexer MX.

If the downstream fiber F' supports M physical channels (or wavelengths) and the number of inputs of the band multiplexer MX (and therefore the number of virtual logical channels at it defines) is equal to N, then the number of combs P supported by the downstream fiber F' is equal to M/N, and each of the N virtual logical channels comprises P different physical channels belonging to P respective different combs.

For example, if M is equal to 80 and N is equal to 16, then P is equal to 80/16=5, and each virtual logical channel comprises five different physical channels belonging to five respective different combs. The network can then be organized so that at any time the band multiplexer MX delivers at its 16 outputs one of the five wavelengths (of the five different combs) of each of the 16 virtual logical channels.

In this second embodiment, at least the fixed optical demultiplexers or the wavelength selector switches DO of the primary stations $S_i$ (which are preferably those farthest from the hub H, possible with the exception of the last $S_n$ if it is at the end of the downstream fiber F'), are connected to coupling means $DXB_i$ each taking the form of a 2×1 de-interleaver.

Each de-interleaver $DXB_i$ has an input connected to a downstream portion of the downstream fiber F', a first output connected to the associated primary station $S_i$ and adapted to its comb of wavelengths, and a second output connected to an upstream portion of the downstream fiber F' and adapted to channels whose wavelengths are different to those of the channels passing through the first output. Consequently, each de-interleaver $DXB_i$ separates spectral multiplexes belonging to the comb of wavelengths of the primary station $S_i$ to which it is connected from spectral multiplexes belonging to the combs of wavelengths of the stations $S_{i+m}$ ($m \geqq 1$) on its upstream side.

As in the first embodiment, the last station $S_n$ at the upstream end of the downstream fiber F' is connected to the fiber via its fixed optical demultiplexer or its wavelength selector switch DO. It is therefore of secondary type in this example. Moreover, the fixed optical demultiplexers or the wavelength selector switches DO of the other stations at the downstream end of the downstream fiber F are connected to the fiber via respective 2×1 optical couplers CP' with a coupling ratio 10%/90%, for example. They are therefore also of secondary type in this example.

Figure 4:
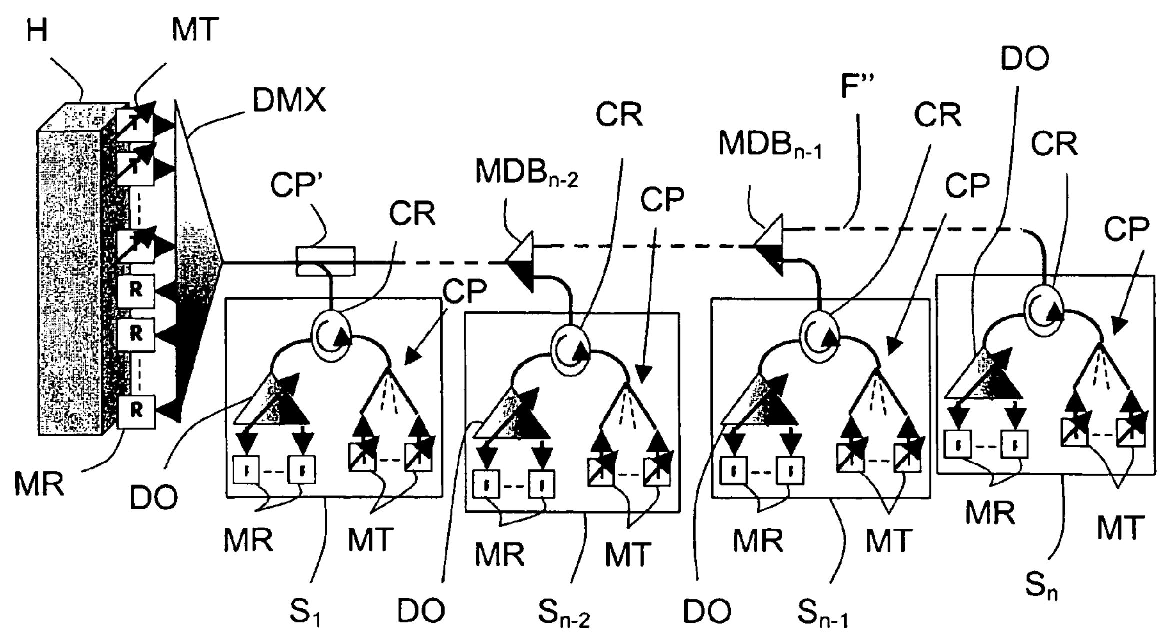
FIG. 4 shows diagrammatically one embodiment of a portion of an optical network of the invention equipped with a bidirectional fiber.

An example of an optical network of the invention in which upstream traffic and downstream traffic is carried by a single bidirectional optical fiber F" is described in detail below with reference to FIG. 4.

This embodiment is, so to speak, a combination of the embodiments described above with reference to FIGS. 2 and 3.

The communications stations $S_i$ include send modules MT and receive modules MR like those described above, respectively connected to passive optical couplers CP and fixed optical multiplexers/demultiplexers or wavelength selector switches DO.

There is also provided in each communications station $S_i$ a circulator CR having an input/output connected either directly to the optical fiber F" in the case of the secondary station $S_n$ farthest from the hub H or to a 2×1 optical coupler CP' with a 10%/90% coupling ratio, for example, for the secondary stations closest to the hub H (here $S_1$), or to a multiplexer/demultiplexer $MDB_i$ for the primary stations (here $S_{n-1}$ and $S_{n-2}$).

Moreover, the hub H comprises receive modules MR and send modules MT connected to the outputs/inputs of a demultiplexer/multiplexer DMX whose input/output is connected to the downstream end of the bidirectional optical fiber F".

As in the case of the upstream fiber F and the downstream fiber F', the coupling means $MDB_i$ used depend in particular on the type of demultiplexer/multiplexer DMX that is connected to the hub H.

In the first embodiment, each primary communications station $S_i$ sends and receives spectral multiplexes of modulated optical signals belonging to a given one of P disjoint bands of wavelengths. Moreover, the demultiplexer/multiplexer DMX is of periodic type. It also defines N virtual logical channels each associated with one of its N outputs/inputs and with wavelengths belonging to different bands of wavelengths, and delivers at each of its N outputs/inputs one of the wavelengths of the virtual logical channel that is associated with it.

If the fiber F" supports M physical channels (or wavelengths) and the number of outputs/inputs of the demultiplexer/multiplexer DMX (and therefore the number of virtual logical channels that it defines) is equal to N, then the number of bands P supported by the fiber F" is equal to M/N, and each of the N virtual logical channels comprises P different physical channels belonging to P respective different bands. It is important to note that here the P bands must be divided between the upstream and downstream traffic.

Again the periodicity may be simple or cyclic. If the periodicity is simple, the demultiplexer/multiplexer DMX can, for example, take the form of an AWG. If the periodicity is cyclic, the demultiplexer/multiplexer DMX can take the form of an AWG or a cascade of de-interleavers/interleavers, for example.

In this first embodiment, at least the primary stations $S_i$ (which are preferably those farthest from the hub H, where applicable with the exception of the last station $S_n$ if it is at the end of the fiber F') are connected to respective coupling means $MDB_i$ each taking the form of a 2×1 band multiplexer/demultiplexer, of the same type as the band multiplexer $MXB_i$ described above with reference to FIG. 2 or the band demultiplexer $DXB_i$ described above with reference to FIG. 3.

Each multiplexer/demultiplexer $MDB_i$ has an output/input connected to a downstream portion of the fiber F", a first input/output connected to the associated primary station $S_i$ and adapted to the band of wavelengths thereof, and a second input/output connected to an upstream portion of the fiber F" and adapted to channels whose wavelengths are different from those of the channels passing through the first output. The upstream and downstream concepts refer to positions relative to the upstream end of the fiber F" that is not connected to the hub H. Consequently, each band multiplexer/demultiplexer $MDB_i$ combines or separates the spectral multiplexers belonging to the band of wavelengths of the primary station $S_i$ to which it is connected with/from the spectral multiplexes belonging to the bands of wavelengths of the primary stations $S_{i+m}$ ($m \geqq 1$) on its upstream side.

For example, in the case of a network R including eight communications stations $S_i$, the five stations $S_3$ to $S_7$ farthest from the hub, apart from the last station $S_8$, are connected to the fiber F" by respective demultiplexer/multiplexers $MDB_i$ and are therefore of primary type, while the two stations $S_1$ and $S_2$ nearest the hub and the station $S_8$ farthest away are connected to the fiber F" by an optical coupler CP' or directly, and are therefore of secondary type.

In a second embodiment, each communications station $S_i$ sends and receives spectral multiplexes of modulated optical signals belonging to a given one of P disjoint combs of wavelengths. Moreover, the demultiplexer/multiplexer DMX is a band demultiplexer/multiplexer. It also defines N virtual logical channels each associated with one of its N outputs/inputs. Each of its N outputs/inputs delivers/receives one of the wavelengths of the virtual logical channel (and therefore of the band) that is associated with it.

If the fiber F" supports M physical channels (or wavelengths) and the number of outputs/inputs of the demultiplexer/multiplexer DMX (and therefore the number of virtual logical channels that it defines) is equal to N, then the number of combs P supported by the fiber F" is equal to M/N and each of the N virtual logical channels comprises P different physical channels belonging to P respective different combs. It is important to note that the P combs must here be divided between upstream traffic and downstream traffic.

For example, if M is equal to 80 and N is equal to 16, then P is equal to 80/16=5, and each virtual logical channel comprises five different physical channels belonging to five respective different combs. The network can then be organized so that at all times the band multiplexer MX delivers at its 16 outputs one of the five wavelengths (of the five different combs) of each of the 16 virtual logical channels.

In this second embodiment, at least the fixed optical multiplexers/demultiplexers or the wavelength selector switches DO of the primary stations $S_i$ (which are preferably those farthest from the hub H, where applicable with the exception of the last one $S_n$ when it is at the end of the fiber F"), are connected to respective coupling means $MDB_i$ each taking the form of a 2×1 interleaver/de-interleaver.

Each interleaver/de-interleaver $MDB_i$ has an input/output connected to a downstream portion of the fiber F", a first output/input connected to the associated primary station $S_i$ and adapted to its comb of wavelengths, and a second output/input connected to an upstream portion of the fiber F" and adapted to channels whose wavelengths are different from those of the channels passing through the first output/input. Consequently, each interleaver/de-interleaver $MDB_i$ combines or separates the spectral multiplexes belonging to the comb of wavelengths of the primary station $S_i$ to which it is connected, relative to the spectral multiplexes belonging to the combs of wavelengths of the primary stations $S_{i+m}$ ($m \geqq 1$) on its upstream side.

The invention is not limited to the optical network embodiments described above by way of example only, and encompasses all variants that the person skilled in the art might envisage that fall within the scope of the following claims.

What is claimed is:

1. A wavelength division multiplex optical network, having a plurality of communications stations, the wavelength division multiplex optical network comprising:

an optical fiber connected to a hub via at least one of an input of a demultiplexer having N outputs and an output of a multiplexer having N inputs;

a first communications station which processes spectral multiplexes of modulated optical signals having different wavelengths via a first type coupling means; and a second communications station which processes spectral multiplexes of modulated optical signals having different wavelengths via a second type coupling means, wherein said first and second communications stations process spectral multiplexes of modulated optical signals from a given one of P disjoint bands of wavelengths, wherein said first type coupling means is at least one of a 2×1 band multiplexer and demultiplexer comprising:

at least one of an output and input connected to a downstream portion of said optical fiber;

at least one of a first input and a first output connected to said first communications station which uses a band of wavelengths from among the P disjoint bands of wavelengths; and at least one of a second input and a second output connected to an upstream portion of said optical fiber which uses channels having wavelengths different from wavelengths of channels passing through the at least one of said first input and said first output, wherein said at least one of a demultiplexer and multiplexer is of periodic type which processes at the at least one of N outputs and inputs channels of wavelengths that belong to distinct sets of P wavelengths, each wavelength of a set belonging to a distinct band of said P disjoint bands of wavelengths, and wherein N and P are integers.

2. The network according to claim 1, wherein a station among said plurality of communications stations connected to a first type coupling means is a primary station, and wherein the wavelength division multiplex optical network comprises at most P primary stations.

3. The network according to claim 1, wherein said first type coupling means is a periodic cyclic type.

4. The network according to claim 3, wherein said periodic first type coupling means is at least one of an arrayed waveguide grating (AWG) wavelength diffraction device and cascades of de-interleavers and/or interleavers.

5. The network according to claim 1, wherein said second coupling means is a 2×1 add or drop optical coupler comprising:

at least one of an output and input connected to a downstream portion of said optical fiber;

at least one of a first input and a first output connected to said second communications station; and at least one of a second input and a second output connected to an upstream portion of said optical fiber.

6. The network according to claim 1, wherein said optical fiber is of monodirectional upstream type, said at least one of a demultiplexer and multiplexer is a demultiplexer having one input and N outputs, and said plurality of communications stations include at least one multiplex sender device connected to an optical coupler, said optical coupler coupled to at least one of said first type coupling means, said second type coupling means, and said fiber.

7. The network according to claim 1, wherein said optical fiber is of the monodirectional downstream type, said at least one of a demultiplexer and multiplexer is a multiplexer having one output and N inputs, and said plurality of communications stations include at least one multiplex receiver device connected to switching means, said switching means coupled to at least one of said first type coupling means, said second type coupling means, and said fiber.

8. The network according to claim 1, wherein said wavelength division multiplex optical network has a ring structure.

9. The network according to claim 1, wherein said first type coupling means is a band multiplexer, and wherein said second type coupling means is at least one of a passive optical coupler which directly connects a device to the optical fiber and an optical coupler having a coupling ratio different than a coupling ratio of the first type coupling means.

10. The network according to claim 1, wherein each of the P disjoint bands of wavelengths comprise a set of wavelengths that are in sequence and are subjected to a same optical processing.

11. A wavelength division multiplex optical network, having a plurality of communications stations, the wavelength division multiplex optical network comprising:

an optical fiber connected to a hub via at least one of an input of a demultiplexer having N outputs and an output of a multiplexer having N inputs;

a first communications station which processes spectral multiplexes of modulated optical signals having different wavelengths via a first type coupling means; and a second communications station which processes spectral multiplexes of modulated optical signals having different wavelengths via a second type coupling means, wherein said first and second communications stations process spectral multiplexes of modulated optical signals from a given one of P disjoint combs of wavelengths, wherein said first type coupling means is a 2×1 wavelength interleaver and/or de-interleaver comprising:

at least one of an output and input connected to a "downstream" portion of said optical fiber;

at least one of a first input and a first output connected to said first communications station which uses a comb of wavelengths from among the P disjoint combs of wavelengths; and a second at least one of an input and output connected to an "upstream" portion of said optical fiber which uses combs different from the comb passing through said first input and said first output, wherein said at least one of a demultiplexer and multiplexer is at least one of a band demultiplexer and multiplexer having the at least one of N outputs and inputs, each at least one of N outputs and inputs associated with a given one of N bands of wavelengths for processing at each of the at least one of N outputs and inputs channels of wavelengths that belong to distinct sets of P wavelengths, each wavelength of a set belonging to a distinct comb of said P disjoint combs, and wherein N and P are integers.

12. The network according to claim 11, wherein a station among said plurality of communications stations connected to a first type coupling means is a primary station, and wherein the wavelength division multiplex optical network comprises at most P primary stations.

13. The network according to claim 11, wherein said second type coupling means is a 2×1 add or drop optical coupler comprising:

a first at least one of an output and input connected to a downstream portion of said optical fiber;

at least one of a first input and a first output connected to said second communications station; and at least one of a second input and a second output connected to an upstream portion of said optical fiber.

14. The network according to claim 11, wherein said optical fiber is of monodirectional upstream type, said at least one of a demultiplexer and multiplexer is a demultiplexer having one input and N outputs, and said plurality of communications stations include at least one multiplex sender device connected to an optical coupler, said optical coupler coupled to at least one of one of said first type coupling means, said second type coupling means, and said fiber.

15. The network according to claim 11, wherein said optical fiber is of the monodirectional downstream type, said at least one of a demultiplexer and multiplexer is a multiplexer having one output and N inputs, and said plurality of communications stations include at least one multiplex receiver device connected to switching means, said switching means coupled to at least one of said first type coupling means, said second type coupling means, and said fiber.

16. A network according to claim 11, wherein said wavelength division multiplex optical network has a ring structure.

17. The network according to claim 11, wherein each of the P combs of wavelengths comprise a set of optical signals whose optical carrier frequencies are regularly spaced.

18. A wavelength division multiplex optical network, comprising:

an optical fiber connected to a hub via at least one of an input of a demultiplexer having N outputs and an output of a multiplexer having N inputs; and a plurality of communications stations which process spectral multiplexes of modulated optical signals with different wavelengths, via coupling means, wherein said plurality of communications stations process spectral multiplexes of modulated optical signals from a given one of P disjoint bands of wavelengths, and wherein at least one of said coupling means is at least one of a 2×1 band multiplexer and demultiplexer comprising:

at least one of an output and an input connected to a "downstream" portion of said optical fiber;

at least one of a first input and a first output connected to one of said stations, then referred to as the "primary" station, and which uses its band of wavelengths; and at least one of a second input and a second output connected to an "upstream" portion of said optical fiber and which uses channels of wavelengths different from the wavelengths of the channels passing through said at least one of said first input and said first output, wherein said at least one of said demultiplexer and multiplexer is of periodic type which processes at each of its N outputs or inputs channels of wavelengths that belong to distinct sets of P wavelengths each belonging to a distinct one of said P disjoint bands, and wherein said optical fiber is of bidirectional type, said at least one of said demultiplexer and multiplexer is a demultiplexer or multiplexer having one input or output and N outputs or inputs, respectively, and said communications stations each include at least one multiplex sender device connected to an optical coupler, at least one multiplex receiver device connected to switching means, and an optical circulator coupled to one of said coupling means or to said fiber and to said switching means and said optical coupler.

19. A wavelength division multiplex optical network, comprising:

an optical fiber connected to a hub via at least one of an input of a demultiplexer having N outputs and an output of a multiplexer having N inputs; and a plurality of communications stations which process spectral multiplexes of modulated optical signals with different wavelengths, via coupling means, wherein said plurality of communications stations process spectral multiplexes of modulated optical signals from a given one of P disjoint bands of wavelengths, and wherein at least one of said coupling means is at least one of a 2×1 band multiplexer and demultiplexer comprising:

at least one of an output and an input connected to a "downstream" portion of said optical fiber;

at least one of a first input and a first output connected to one of said stations, then referred to as the "primary" station, and which uses its band of wavelengths; and at least one of a second input and a second output connected to an "upstream" portion of said optical fiber and which uses channels of wavelengths different from the wavelengths of the channels passing through said at least one of said first input and said first output, wherein said at least one of said demultiplexer and said multiplexer is of periodic type which process at each of its N outputs or inputs channels of wavelengths that belong to distinct sets of P wavelengths each belonging to a distinct one of said P disjoint bands, wherein said fiber comprises:

a first optical fiber of monodirectional downstream type, connected to a multiplexer having one output and N inputs; and a second optical fiber of monodirectional upstream type, connected to a demultiplexer having one input and N outputs, and wherein said communications stations each include at least one multiplex sender device connected to an optical coupler, itself coupled to one of the coupling means connected to said second optical fiber or to said second optical fiber, and at least one multiplex receiver device, either connected to switching means, itself connected to one of the coupling means connected to said first optical fiber or connected to said first optical fiber.

20. A wavelength division multiplex optical network, comprising:

an optical fiber connected to a hub via at least one of an input of a demultiplexer having N outputs and an output of a multiplexer having N inputs; and a plurality of communications stations which process spectral multiplexes of modulated optical signals with different wavelengths, via coupling means, wherein said plurality of communications stations process spectral multiplexes of modulated optical signals from a given one of P disjoint bands of wavelengths, and wherein at least one of said coupling means is at least one of a 2×1 band multiplexer and demultiplexer comprising:

at least one of an output and an input connected to a "downstream" portion of said optical fiber;

at least one of a first input and a first output connected to one of said stations, then referred to as the "primary" station, and which uses its band of wavelengths; and at least one of a second input and a second output connected to an "upstream" portion of said optical fiber and which uses channels of wavelengths different from the wavelengths of the channels passing through said at least one of said first input and said first output, wherein said at least one of said demultiplexer and multiplexer is of periodic type which processes at each of its N outputs or inputs channels of wavelengths that belong to distinct sets of P wavelengths each belonging to a distinct one of said P disjoint bands, wherein said optical fiber is of the monodirectional downstream type, said at least one of said demultiplexer and multiplexer is a multiplexer having one output and N inputs, and said communications stations each include at least one multiplex receiver device connected to switching means coupled to one of said coupling means or to said fiber, and wherein said switching means are chosen in a group comprising a demultiplexer and a wavelength selector switch.

21. A wavelength division multiplex optical network comprising:

an optical fiber connected to a hub via at least one of an input of a demultiplexer having N outputs and an output of a multiplexer having N inputs; and two communications stations which process spectral multiplexes of modulated optical signals with different wavelengths, via coupling means, wherein said communications stations process spectral multiplexes of modulated optical signals from a given one of P disjoint combs of wavelengths, and wherein at least one of said coupling means is at least one of a 2×1 wavelength interleaver and de-interleaver comprising:

at least one of an output and input connected to a "downstream" portion of said optical fiber;

at least one of a first input and a first output connected to one of said communications stations, which is then referred to as the "primary" station, and which uses its comb of wavelengths; and at least one of a second input and a second output connected to an "upstream" portion of said optical fiber and which uses combs different from the comb passing through said at least one of said first input and said first output, wherein said at least one of said demultiplexer and multiplexer is at least one of a band demultiplexer and multiplexer having N outputs or inputs, respectively, each associated with a given one of N bands of wavelengths which process at each of its N outputs or inputs channels of wavelengths that belong to distinct sets of P wavelengths, each belonging to a distinct one of said P disjoint combs, and wherein said optical fiber is of bidirectional type, said at least one of said demultiplexer and multiplexer is at least one of a demultiplexer and multiplexer having one input or output and N outputs or inputs, respectively, and said communications stations each include at least one multiplex sender device connected to an optical coupler, at least one multiplex receiver device connected to switching means, and an optical circulator coupled to one of said coupling means or to said fiber and to said switching means and said optical coupler.

22. A wavelength division multiplex optical network comprising:

an optical fiber connected to a hub via at least one of an input of a demultiplexer having N outputs and an output of a multiplexer having N inputs; and two communications stations which process spectral multiplexes of modulated optical signals with different wavelengths, via coupling means, wherein said communications stations process spectral multiplexes of modulated optical signals from a given one of P disjoint combs of wavelengths, and wherein at least one of said coupling means is at least one of a 2×1 wavelength interleaver and de-interleaver comprising:

at least one of an output and an input connected to a “downstream” portion of said optical fiber;

at least one of a first input and a first output connected to one of said communications stations, which is then referred to as the “primary” station, and which uses its comb of wavelengths; and at least one of a second input and a second output connected to an “upstream” portion of said optical fiber and which uses combs different from the comb passing through said at least one of said first input and said first output, wherein said at least one of said demultiplexer and multiplexer is at least one of a band demultiplexer and multiplexer having N outputs or inputs, respectively, each associated with a given one of N bands of wavelengths which process at each of its N outputs or inputs channels of wavelengths that belong to distinct sets of P wavelengths, each belonging to a distinct one of said P disjoint combs, wherein said optical fiber comprises:

a first optical fiber of monodirectional downstream type, connected to a multiplexer having one output and N inputs; and a second optical fiber of monodirectional upstream type, connected to a demultiplexer having one input and N outputs, and wherein said communications stations each include at least one multiplex sender device connected to an optical coupler, itself coupled to one of the coupling means connected to said second optical fiber or to said second optical fiber, and at least one multiplex receiver device, either connected to switching means, itself connected to one of the coupling means connected to said first optical fiber or connected to said first optical fiber.

* * * * *